(12) United States Patent
Irnich et al.

(10) Patent No.: US 6,415,811 B1
(45) Date of Patent: Jul. 9, 2002

(54) COOLED SLIDER PLATE, PARTICULARLY A WATER-COOLED HOT AIR SLIDER PLATE

(75) Inventors: Franz-Josef Irnich, Hürtgenwald-Gey; Dietrich Zosel, Düren, both of (DE)

(73) Assignee: Zimmermann & Jansen GmbH (DE)

( * ) Notice: Subject to any disclaimer, the term of this patent is extended or adjusted under 35 U.S.C. 154(b) by 0 days.

(21) Appl. No.: 08/640,917

(22) PCT Filed: Nov. 9, 1994

(86) PCT No.: PCT/EP94/03695
§ 371 (c)(1),
(2), (4) Date: Jun. 27, 1996

(87) PCT Pub. No.: WO95/13493
PCT Pub. Date: May 18, 1995

(30) Foreign Application Priority Data

Nov. 10, 1993 (DE) .......................................... 43 38 431

(51) Int. Cl.⁷ ............................................... F16K 49/00
(52) U.S. Cl. ........................ 137/340; 165/86; 165/170
(58) Field of Search ............................ 137/340; 165/86, 165/168, 170

(56) References Cited

U.S. PATENT DOCUMENTS

| 3,266,517 A | * | 8/1966 | Carr | ........................ 137/340 |
| 3,499,462 A | * | 3/1970 | Berczynski | ................. 137/340 |
| 3,848,665 A | * | 11/1974 | Uerlichs et al. | ............ 137/340 |
| 4,262,638 A | | 4/1981 | Coulin | |

FOREIGN PATENT DOCUMENTS

| DE | 1 212 378 | | 3/1966 | |
| DE | 2 243 588 | | 9/1972 | |
| DE | 2 322 266 | | 11/1974 | |
| DE | 23 66 032 C3 | | 11/1983 | |
| DE | 28 57 706 C2 | | 8/1986 | |
| DE | 93/10388 | | 5/1993 | |
| EP | 0 010 501 | | 10/1979 | |
| FR | 1468188 | * | 2/1967 | ................. 137/340 |
| FR | 2 051 038 | | 3/1971 | |
| GB | 1288250 | * | 9/1972 | ................. 137/340 |

* cited by examiner

Primary Examiner—A. Michael Chambers
(74) Attorney, Agent, or Firm—Cesari and McKenna, LLP

(57) ABSTRACT

A water cooled hot air slider plate with a cooling channel, through which a cooling medium flows. A seal extends over the perimeter of the plate, both sides of the plate with the exception of the seal are joining a seal adapted to adjoin a seal seat of a slider housing being covered with a heat-insulating material. The part of the slider plate limited by the seal is formed by a core plate which incorporates bores extending in the plane of the plate which bores are in fluid connection with one another to form a predetermined meandering cooling channel.

16 Claims, 17 Drawing Sheets

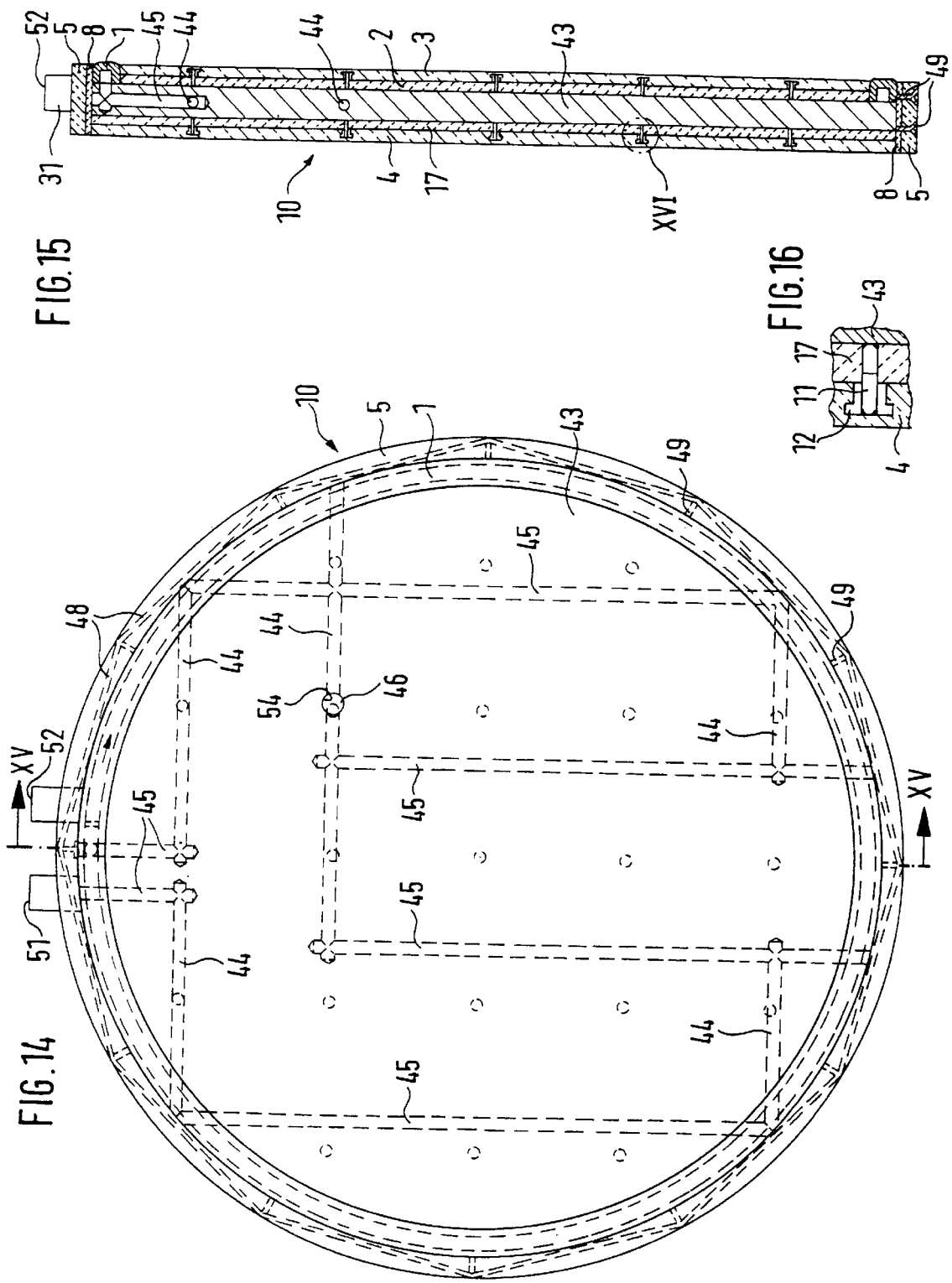

COOLED SLIDER PLATE, PARTICULARLY A WATER-COOLED HOT AIR SLIDER PLATE

BACKGROUND OF THE INVENTION

The invention relates to a cooled slider plate, particularly a water-cooled hot air slider plate, according to the preamble of claims 1, 7, 9 or 11.

Slider plates according to DE-C 23 66 032 are in general use. These serve to block off pipes carrying hot gas which can have a diameter of up to approximately two meters and more.

A known slider plate of this type usually incorporates a seal stretching along its perimeter and this seal delimits a part of the slider plate lying radially inside. According to DE-C 23 66 032 this part of the slider plate is cooled with the aid of a cooling medium. Since, when the slider plate is closed, temperatures of over 1000° C. can fall over the slider plate, separate cooling is necessary, in order to reduce heat-dependent stress and a consequent bending of the slider plate.

In concrete terms, in the known construction, the part of the slider plate delimited by the seal includes two plates, which are axially distanced from one another by dividing walls designed as spiral shaped. A continuous flow channel is formed by these dividing walls, from a cooling medium inlet, situated on the peripheral edge of the slider plate, to an outlet, likewise arranged on the peripheral edge, the cooling medium being guided inwards at first in a spiral shape, in order to flow from there, i.e. from a flow reversal point situated in the central area of the slider plate, outwards to the cooling medium outlet, again flowing in a spiral shape.

A disadvantage of this known construction is the expensive manufacture of the slider plate. For example, it is only possible with relatively large expenditure to weld the dividing walls delimiting the double spiral shaped cooling channel, with the two plates. In addition to this, in the known design, a large amount of cooling medium is required in order to achieve adequate cooling of the slider plate. The necessary pump capacity is correspondingly high. Moreover, in this known design, an unnecessarily large amount of heat is lost from the process. Different cooling between slider plate and seal seat has a particularly disadvantageous effect, as, through this, additional stress is produced, which can reduce both the reliability and life of the slider plate.

From DE-A 22 43 588 a slider plate according to the preamble of claim 1 is known, which in comparison with the state of the art according to DE-C 23 66 032 is considerably simpler in construction. On the other hand, the area covered by the cooling medium is relatively small, thus the slider plate according to DE-A 22 43 588 cannot be used for blocking purposes at high temperatures, or only in a limited way.

SUMMARY OF THE INVENTION

It is the purpose of the present invention to develop the cooled slider plate just mentioned, in such a way that it can be used for blocking purposes at high temperatures yet remain simple and inexpensive to manufacture.

This purpose is fulfilled alternatively through the features of the characterising parts of the independent claim.

The slider plate according to the invention can be manufactured simply and inexpensively, since just a simple pipe has to be bent into a double spiral shape. Furthermore, through the choice of a particular inner diameter or a particular wall thickness, individual cooling or stability needs of the slider plate can be taken into account.

According to the invention, the neighboring sections of the pipe bent in a spiral shape adjoin one another, with the exception of a central pipe part forming the flow reversal area, thus an equally spiral-shaped line of contact is formed. In the region of the line of contact, the adjoining pipe sections are preferably connected with one another and thus a plate element of particularly stable shape is created. For making the connection, welding is particularly suitable which can be carried out simply on easily accessible parts of the line of contact.

The flow reversal occurs—as already indicated—in the central plate area through a pipe section, bent in an S-shape, which is designed as one piece with the pipe bent in a double spiral shape and creates a fluid connection between the two pipe parts designed as a spiral shape.

The central flow reversal area has, between the pipe section, bent in an S-shape, and the ajoining spiral pipe sections, a space that is not cooled by the cooling medium flowing in the pipe. For cooling this space, metal sheets are preferably arranged, axially distanced from one another, in the area of the two outer surfaces in such a way that they, together with the adjoining spiral pipe sections, enclose this space. The cooling medium can then be led from the pipe in and out of this space via inlet and outlet openings in the pipe section, bent in an S-shape.

In particular, it is possible to divide the space delimited by the two metal sheets with an intermediate plate, thus partial spaces are created, through each of which cooling medium is forced.

To improve the flow through the space enclosed by the metal sheets, it is possible for the passage of the pipe bent in an S-shape to be restricted or completely interrupted between inlet and outlet apertures. Alternatively, a piece can be taken out of the pipe bent in an S-shape.

According to the second alternative of a cooled slider plate according to the invention, the double spiral shaped cooling channel is formed in that a double spiral shaped groove, formed in a base plate, is closed with a cover plate. The flow reversal occurs again in the central area of the slider plate, the bend radius of the S-shaped groove section not being, in the manufacturing process, limited depending on the material as with the pipe. For the supply and removal of the cooling medium, the axially closed groove must, in each case, be connected at the end side with a cooling agent inlet or outlet. This alternative also offers an inexpensive way of manufacturing simply a cooled slider plate with the desired flow passage surface.

A particularly simple and quick way of applying the cover plate to the base plate is provided by "exploding" same.

In a third alternative, the cooling channel is formed between a carrying plate and a sheet of metal, which form the part of the slider plate surrounded by the seal. The metal sheet has a double spiral or double meander shaped distortion, forming a corresponding channel. The distortion formed in the metal sheet can be shaped before (e.g. by impressing), during (e.g. by explosive forming) or after (e.g. by hydraulic inflation) application of the metal sheet to the carrying plate. Since sheet metal is particularly easy to shape and work, the above-mentioned possibility represents a particularly cheap manufacturing alternative for a cooling channel in or on a slider plate, the dimensions of the cooling channel being determinable by the choice of the measurements of the opening.

The metal sheet is, by preference, "exploded" on to the carrying plate (explosive forming with surface contact) or connected impermeably with it by roll welding (with line contact). With both these processes, quick and secure connection of the two parts to be connected is achieved with the formation of a cooling channel which is impermeable towards the outside.

A particularly simple alternative of a cooled slider plate has bores provided in a core plate, which intersect, forming a preferably meander shaped cooling channel, which bores are in a fluid connection with one another.

To form a desired flow course, closure stoppers can be placed in the bores. A particularly simply way of doing this is offered by axial bores, provided in the core plate, which are arranged in the region of the bores to be closed and into which the closure stoppers can be inserted. On their outer side, the bores forming the cooling channel—apart from a cooling medium inlet or outlet—are sealed by plugs or similar blocking members. The seal surrounding the slider plate at its perimeter, especially welded on, can be used for the radial closure of the bores.

A slider plate shaped according to the fourth alternative can also be manufactured cheaply and simply, the choice of the grid configuration and the bore diameter being able to be matched to the necessary cooling requirements for the particular plate.

For minimal cooling with a low cooling capacity, the insulation of the slider plate must be as good as possible. It is proposed, therefore, that the heat-insulating covering should be formed on both sides as well as on the perimeter, in each case in two layers, namely an inner, especially "Mikrothe" (trademark) insulation (microporous ceramic mat or plate with a thermal conductivity coefficient lambda= 0.02 W/mK at 20° C.) and an outer insulation consisting especially of a ceramic fibre foam or refractory concrete plate.

Since bending of the slider plate and/or thermal stress cannot be completely excluded despite the cooling, the outer insulation is preferably arranged with radial and axial play, thus it has sufficient play if the plate bends or expands and cannot be damaged by forces working on it. Damage of this kind is in any case to be avoided, since, if the outer insulation is broken, the hot gases come directly into contact with the inner insulation or with the central and cooled part of the slider plate. Because of this the inner insulation could, for one thing, be damaged (e.g. through the insulation melting away or on) or the cooling of the slider plate could no longer be adequate.

The insulation or insulations are preferably held by retaining bolts or pins, especially welded on ones, arranged like a grid on the slider plate.

In order to ensure the radial and axial mobility of the outer insulation, the retaining bolts or pins can be provided with a coating, which at high temperatures— when it is first used, therefore—burns away, so that an expansion gap then occurs between insulation and bolts or pins.

An alternative possibility for fixing the outer insulation consists in providing existing tightening members, particularly tightening cords, made out of insulating material, particularly ceramic material, which are arranged in the outer insulation and guided via rings or eyelets, so that the insulation is pretensioned radially and/or tangentially. The tightening members are, by preference, embedded in the manner of a grill in the interior of the outer insulation and extend in two directions perpendicular to one another, particularly net-like or respectively in a meander shape. Play for the outer insulation in axial and radial direction can thus be guaranteed, without heat bridges arising between the surroundings and the cooled part of the slider plate.

According to a further advantageous embodiment of the invention, a tightening cord is provided inside an insulating ring extending over the outer perimeter of the slider plate and this cord consists likewise of insulating material, especially ceramic material and is tightened via ring or 'y' armatures arranged approximately at the same angular distance from one another, so that the outer insulation is held together radially.

BRIEF DESCRIPTION OF THE DRAWINGS

The invention is described in greater detail below, also in respect of further characteristics and advantages, with the aid of the description of embodiments, given by way of example and with reference to the enclosed drawings. The drawings show in FIG. 1 a schematic side view of the carrying part of a first embodiment of a coolable slider plate, FIG. 2 a schematic sectional view along the line II—II from FIG. 1, slider plate insulations being shown in the upper part of the representation, FIGS. 3a to 3d enlarged detailed sectional views of different construction alternatives for section III from FIG. 2, showing in detail particularly the arrangement and design of the seal, FIGS. 4a and 4b enlarged detailed sectional views of different construction alternatives for section IV from FIG. 2, showing especially the central region of the slider plate, FIGS. 5a and 5b enlarged detailed sectional views, which show ways of attaching insulation to slider plates manufactured according to the first embodiment, FIG. 6 an enlarged detailed sectional view along line VI—VI from FIG. 1, FIG. 7 a schematic side view of the carrying part of a second embodiment of a coolable slider plate, FIG. 8 a sectional view along line VIII—VIII from FIG. 7, in which the cover plate applied to the base plate is shown, as are insulations in the upper part of the diagram, FIG. 9 a schematic side view of the carrying part of a third embodiment of a coolable slider plate, FIG. 10 a schematic sectional view along line X—X from FIG. 9, depicting the slider plate insulation as well, FIG. 11 an enlarged detailed view of section XI from FIG. 10, depicting a way of attaching the slider plate insulation FIG. 12 an enlarged detailed view from FIG. 9, but without the seal surrounding the slider plate at its perimeter as well as radial insulation, FIG. 13a a sectional view along line XIIIa—XIIIa from FIG. 12 without insulation, FIG. 13b an enlarged diagram of a cooling agent outlet passage, FIG. 14 a schematic side view of the carrying part of a fourth embodiment of a coolable slider plate, where bores arranged in a core plate are represented as broken lines, FIG. 15 a side view along line XV—XV from FIG. 14 with slider plate insulation, FIG. 16 an enlarged diagram of section XVI from FIG. 15, depicting a way of attaching the slider plate insulation, FIG. 17 a schematic side view of a coolable slider plate as FIG. 14 but depicting the leading in of a tightening cord that is provided in the outer insulation, FIG. 18 an enlarged diagram of a ring pin, which is arranged to turn and tauten the tightening cord on the slider plate, FIGS. 19a and 19b schematic and enlarged local section diagrams, which show a method of applying the metal sheet to the carrying plate to form a cooling channel, and FIGS. 20a and 20b schematic and enlarged local section diagrams, which show a further method of applying the metal sheet to the carrying plate.

DESCRIPTION OF THE PREFERRED EMBODIMENT

In what follows the same reference numbers refer to the same or corresponding parts.

The slider plate 10 shown in the figures is arranged in operation in a slider plate housing, not depicted, a passage in the slider plate housing being open when the slider plate is open and blocked when the slider plate is closed. In this arrangement a seal, to be described later and surrounding the slider plate 10 radially outside, or a surface of said seal, adjoins a seal seat of the housing, so that the passage that is to be blocked off in the slider plate housing is locked, forming a seal. Alternatively, two surfaces of the seal, facing one another, can also serve to form a seal with the seal seats provided in the slider plate housing.

In FIGS. 1 to 6 a first embodiment of a cooled slider plate 10 is shown in different versions.

Figure 1:
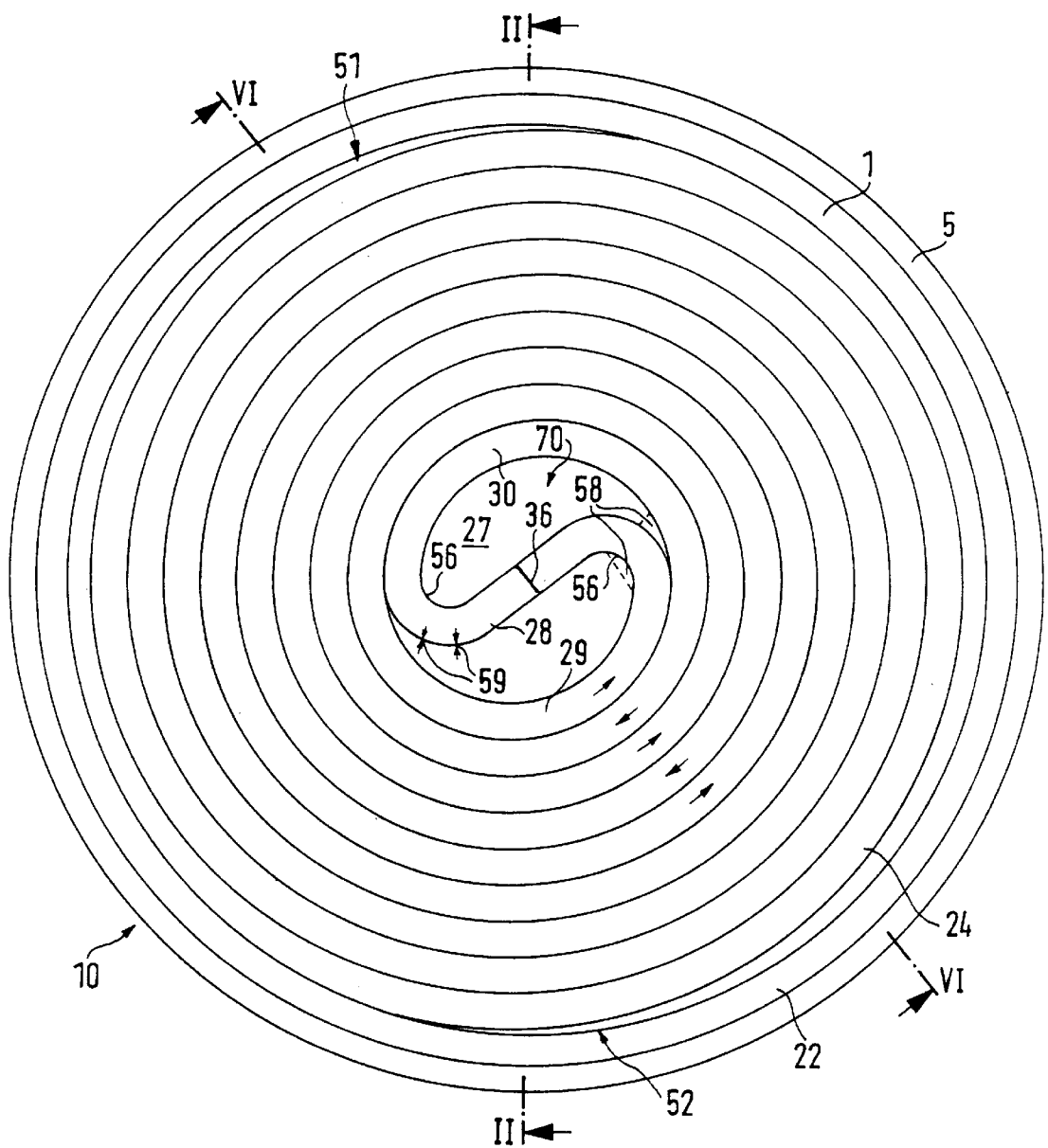

The slider plate 10 has a metallic supporting structure, which incorporates a ring-shaped seal 1 which extends over the perimeter of the plate and borders a slider plate disc. This slider plate disc is —as represented in FIG. 1—formed from a pipe 24, bent in a double spiral shape. The pipe 24, present in its initial state as a straight pipe, is bent in the warm state.

The pipe 24, bent in a double spiral shape, is arranged in the plane of the slider plate and bent in such a way that the pipe sections lying beside one another butt on to each other, so that a likewise double spiral shaped line of contact is formed (see FIG. 1).

Figure 2:
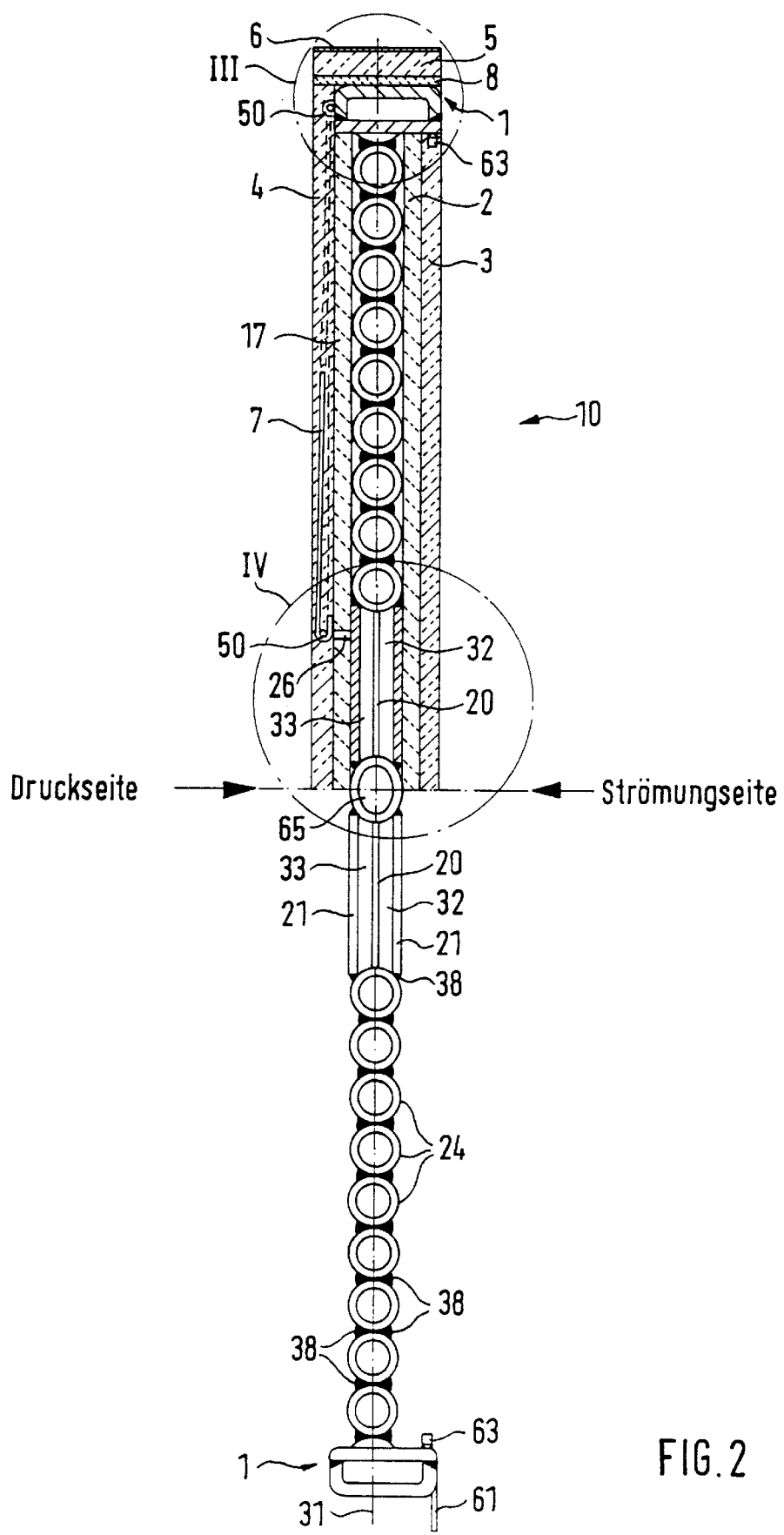

From the sectional view of FIG. 2 it can be recognised that the adjoining pipe sections of the spiral sections 29 and 30 are in each case welded with one another (see weld seams 38). In this way a plate part is formed which, on the one hand, has a particularly stable shape and, on the other hand, is sufficiently flexible. The slider plate formed in this way can, with the usual differential pressures, adapt without any problem to the shaped seat profile of the slider plate housing.

In a central part of the slider plate the pipe 24 is bent in an S-shape, the two spiral pipe sections 29 and 30 being connected with one another by a pipe section 28, bent in an S-shape. The S-shape pipe section 28 defines a flow reversal area 27, in which the cooling medium, flowing through the pipe 24, changes its flow circulation direction.

The dimension of the S-shaped pipe section 28 is limited by a technologically determined minimum bend radius 56, which is dependent on the material used as well as on the necessary wall thickness of the cooling pipe. Correspondingly pipe-free spaces 70 are formed between the S-shaped pipe section 28 and the adjoining spiral pipe sections 29 and 30.

In order, nevertheless, to be able to cool the slider plate 10 in this region, as is shown in FIGS. 2, 4a, 4b and 6, in each case two metal sheets, distanced axially from one another and lying in the region of the two outer surfaces of the slider plate, are welded both on the pipe section 28, bent in an S-shape, and on to the spiral pipe sections 29 and 30 which adjoin it. Through the metal sheets 21, the S-shaped pipe section 28, as well as the adjoining spiral pipe sections 29 and 30, an enclosed space 70 is formed. From inlet 34 and outlet openings 35 the cooling medium can move out of the S-shaped pipe section 28 into the enclosed space 70 or out of it again, so that in this region, too, cooling takes place.

According to FIGS. 2, 4a, 4b and 6, between the two metal sheets 21, in each case an intermediate plate is arranged, which divides the enclosed space 70 into two partial spaces 32 and 33. The individual partial spaces 32, 33 have the cooling medium flowing through them in the way shown in FIG. 6. The reference number 67 indicates the flow direction of the cooling medium. The circled dots represent a flow direction out of the plane of the drawing and the circled crosses represent a flow direction into the plane of the drawing. Besides this, bores (not shown) can be formed in the intermediate plate 20, so that the cooling medium can flow from one partial space to the other.

In order to achieve a better flow of the cooling medium through the space enclosed by the metal sheets 21, or the individual partial spaces 32 and 33, the cross-section of the pipe 24 can be reduced in the S-shaped pipe section 28 between the inlet 34 and outlet openings 35 and the flow can be correspondingly restricted (see reference number 65 in FIG. 2). The throttle is arranged displaced slightly longitudinally from the geometric centre of the spiral.

In an extreme case, it is also possible to interrupt altogether the passage between the inlet 34 and outlet openings 35. Then the cooling medium will flow completely through the space 70 or the partial spaces 32 and 33. Alternatively, it is also possible to separate out the straight middle part of the double spiral and allow the cooling medium to flow freely between the two metal sheets 21—without intermediate plate 20. The inflow and outflow areas are shown in FIG. 1 by the reference numbers 58 and 59.

In FIGS. 1 to 6, no cooling medium inlet or outlet is shown through which the cooling medium is supplied or taken away. For this purpose, reference is made to the following embodiments, given by way of example.

The seal 1 surrounding the part of the slider plate formed by the pipe 24 is, as can be seen particularly from FIGS. 3a to 3d, formed from a U-section ring 22 and a flat strip ring arranged radially inside, which rings are welded to one another (weld seams 38'). According to FIGS. 3a to 3c, the U-section ring 22 is placed radially on the ring 23. Thus the weld seams 38' must be arranged axially.

Since the seal 1 is, with a leg of the U-section ring 22, adjacent to the initially mentioned seal seat of the slider plate housing, it is advantageous to choose a weld seam configuration, in which the weld seam is not arranged in the contact surface. Furthermore, care should be taken to see that the weld seam lies outside the main stressed zone between the cooled seal seat and the hot surroundings when the slider plate is open. A possible way of achieving this can be recognized in FIG. 3d, according to which the flat strip ring 23 is arranged and welded between the legs of the U-section ring 22.

By joining together the U-section ring 22 and the flat strip ring 23 a ring cavity is shaped in the seal 1, through which, likewise, cooling medium can be led for cooling. The flow cross-section of the ring cavity corresponds to that of the cooling channel of the slider plate, so that stress arising from different cooling of the sealing ring and the rest of the slider plate can be avoided.

The seal 1 is welded off-center, displaced in the direction towards the flow side (in the figures, in each case, the right side), on to the part of the slider plate formed by the double spiral pipe 24 (see FIG. 2).

The carrying part of the slider plate 10, comprising the double spiral pipe 24 as well as the seal 1, is completely insulated up to the part of the seal 1 adjacent to the seal seat of the slider plate housing. The heat-insulating covering of the slider plate 10 is constructed in two layers and comprises, on both sides of the slider plate as well as at the plate's perimeter, both an inner and an outer insulation.

The inner insulations 2 and 17 on both sides of the slider plate, which extend radially inside along the whole plate part formed by the pipe 24, bent into a double spiral shape, as well as the inner insulation 8 which surrounds the seal 1 at its perimeter, consist of the aforesaid microporous ceramic mat material; trademark and the material being available.

The outer insulations, arranged radially and axially outside the inner insulations, namely the outer insulations 3 and 4 of both slider plate sides as well as the outer insulation 6 at the plate's perimeter, consist of a ceramic fiber foam plate, which keeps the surface temperature of the Mikrotherm insulation in the direction of the medium below 1100° C. and thus under its maximum load. The ceramic fibre foam plates can, within certain limits, expand freely radially and axially and have sufficient clearance from the microporows ceramic met insulation to enable the maximum flexible bending of the metallic supporting structure to be compensated. A series of possible ways of attaching insulation for free radial expansion of the outer insulations 3, 4 and 5 is described below.

The outer insulation 3 on the flow side of the slider plate 10 extends like the flow-side inner insulation 2 radially inside the seal 1 over the whole slider plate 10. On the opposite pressure-side (the left side in the figures) the outer insulation 4 extends in a radial direction over the seal 1 and butts on to the inner insulation 8 surrounding the seal 1. Altogether, a rectangular-shaped cross-section is defined by the outer insulations 3, 4 and 5 as well as a part of the. seal.

The attachment of the individual insulations will be dealt with in what follows. According to FIG. 3a, a ceramic fiber fabric 6 surrounds radially the outer perimeter insulation 5 and holds the insulation 5 on the seal, said insulation terminating flush with the seal 1 or the outer insulation 4. Alternatively, instead of the ceramic fiber fabric 6 a ceramic sealing mat (type: Interam) can also be used which experiences radial expansion when it first reaches a threshold temperature. Thus pressure is created which keeps the radial distance constant.

Alternatively, it is also possible to fasten the radially outer insulation 5 on the seal with "Hexmesh" (registered trademark).

Figure 3A:
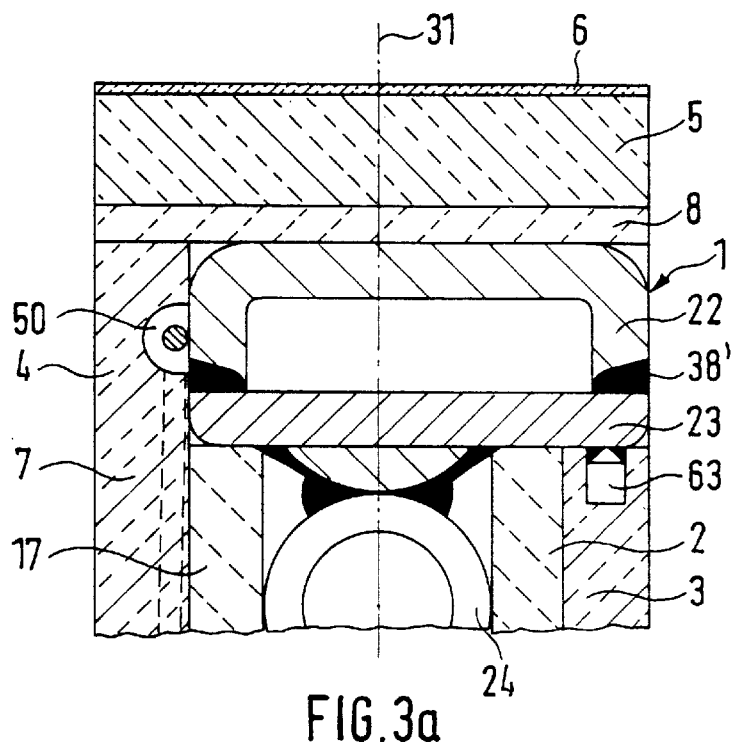
Figure 3B:
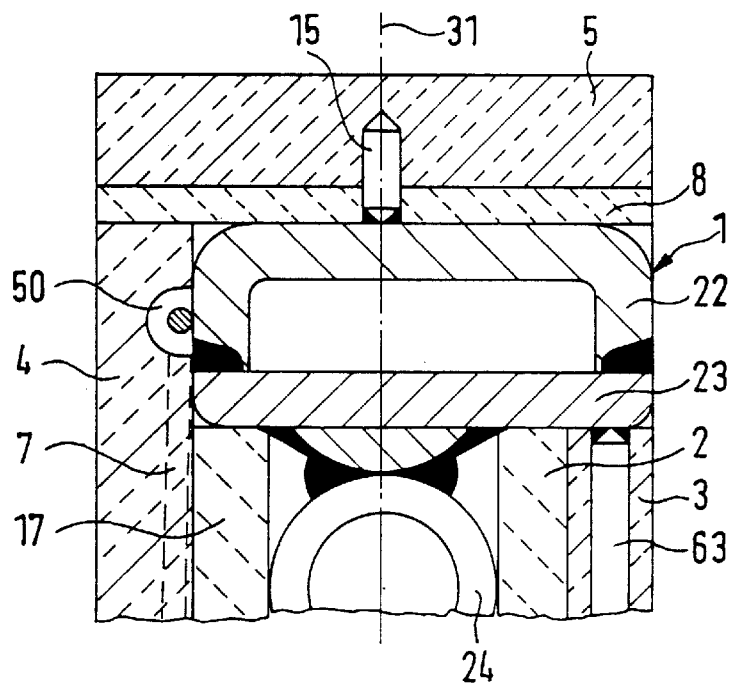

According to FIG. 3b, retaining pins 15, projecting radially outwards are welded on the outer perimeter of the seal in approximately equal angular separation. These retaining pins 15 extend completely through the inner insulation 8 and penetrate the outer insulation 5. They prevent both an axial and a tangential displacement of the insulations 5 and 8.

In FIGS. 3a and 3b or 2 and 4a the external pressure-side insulation 4 is held by especially a cast tightening cord 7 arranged in the interior of this insulation, which cord is held and guided in eyelets or ring pins 50, which are welded on the seal 1, on the pipe 24 and/or the metal sheets 21. The tightening cord 7 pretensions the outer insulation 4 radially and tangentially. However, the tightening cord 7 allows the insulation axial and radial play. In particular, through the use of a tightening cord 7 of this kind, situated in the interior of the outer insulation 4, no heat bridges are formed between the surroundings of the slider plate 10 and the cooled part of the same, so that the insulation is fully effective over the whole slider plate 10.

Figure 3C:
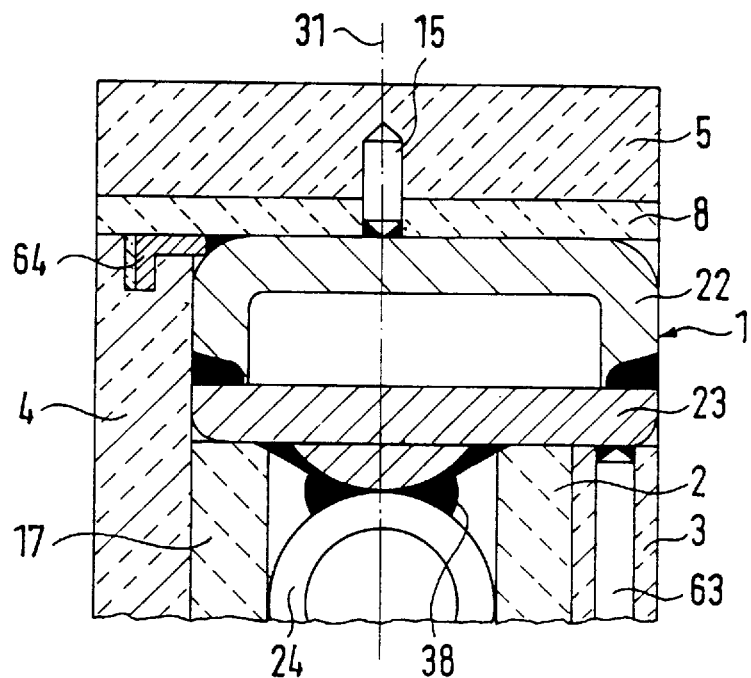

A further alternative means of attaching the external pressure-side insulation 4 is represented in FIG. 3c. For this, hooks, placed at approximately equal angles, or an angle section ring, are welded to the seal 1, with, in each case, one leg pointing axially outwards and the second leg pointing radially inwards from the outer end of the part facing axially outwards. This second leg goes into a groove provided on the outer perimeter of the external insulation 4, so that the latter is held in an axial direction. Through the sizing of the groove provided in the outer insulation 4, play can be provided so that both radial and axial movement of the outer insulation 4 is possible, within certain limits.

Figure 3D:
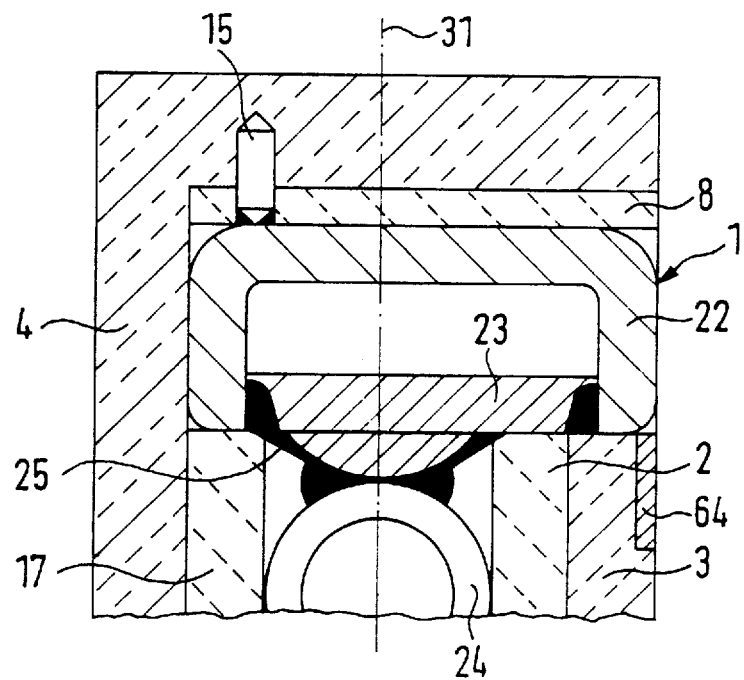

According to FIG. 3d, on the pressure side the outer insulation 4 is connected in one piece with the outer insulation 5 arranged on the perimeter, and, analogously with FIG. 3b or 3c, retaining pins 15 are arranged radially outside at intervals on the perimeter, which pins extend through the inner insulation 8 as well as partially into the insulation 4, formed as one piece,and likewise prevent axial and tangential displacement of the insulation 4. For reasons of symmetry, the retaining pins 15 in this alternative are arranged, not in the center plane, but staggered on the pressure side.

The possible ways of attaching the insulations in FIGS. 3a to 3d allow free radial expansion of the insulation components.

Figure 4B:
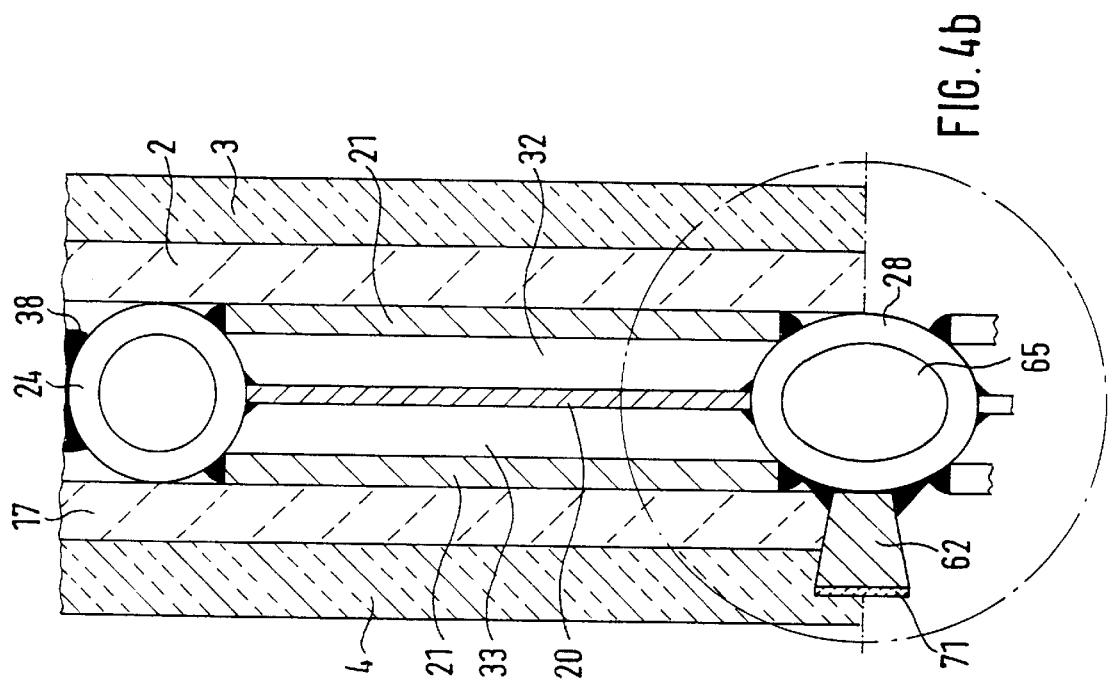
Figure 4A:
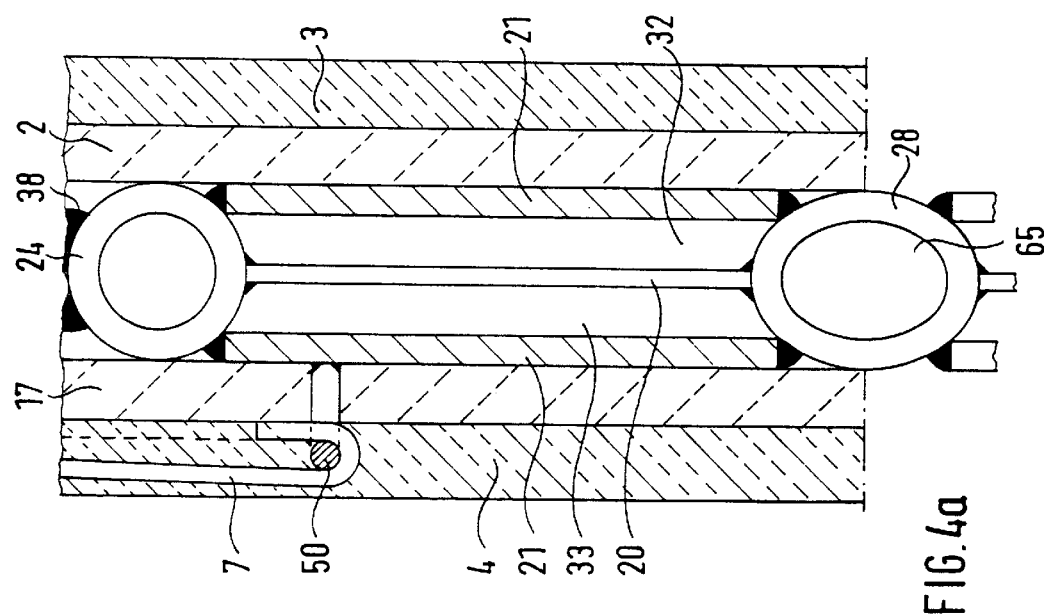
Figure 5A:
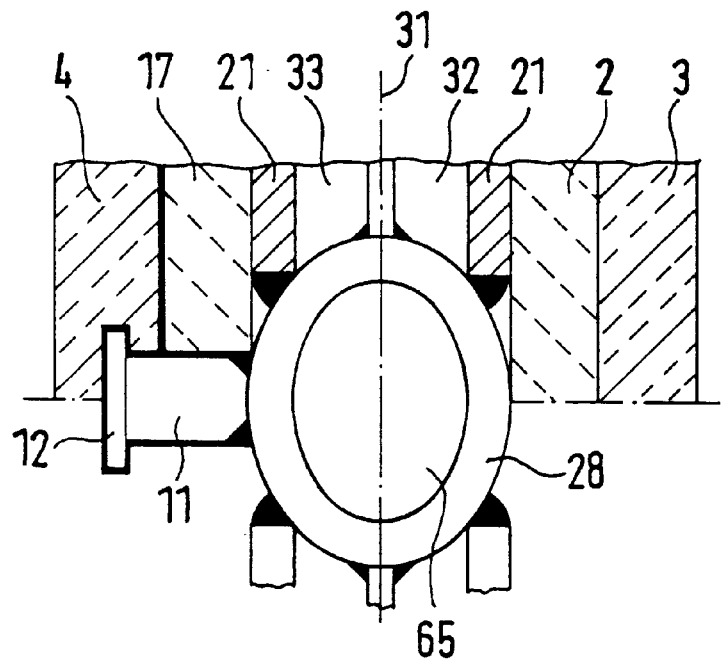
Figure 5B:
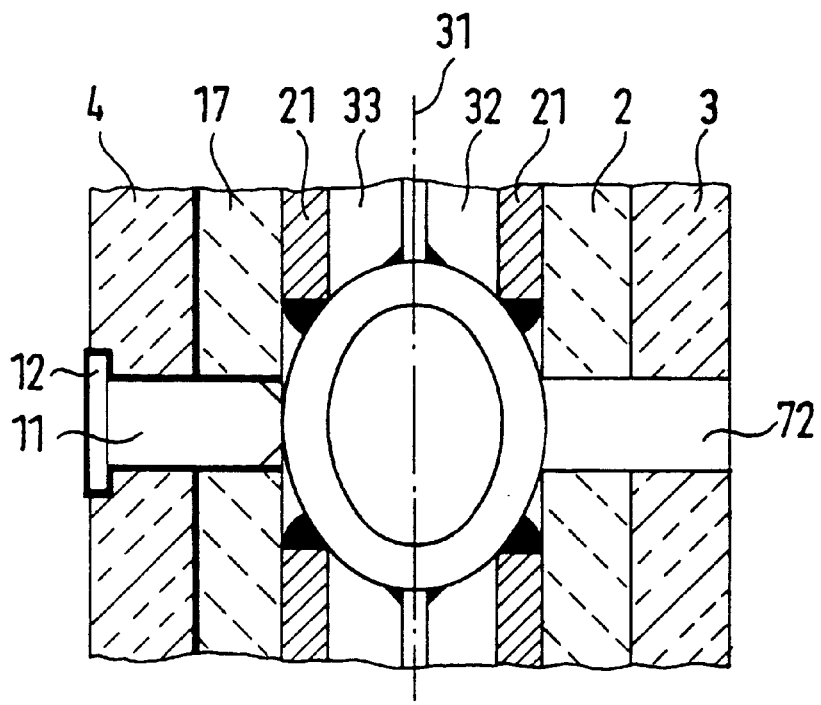
Figure 6:
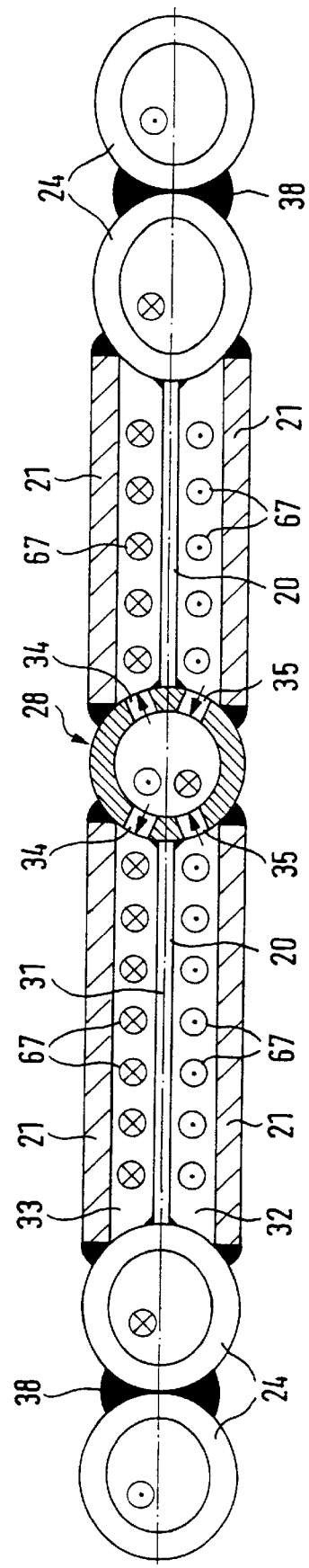

In FIGS. 4b, 5a and 5b, further possible ways of attaching the inner and outer insulations are shown.

According to FIG. 4b, in the middle of the part of the slider plate formed by the pipe 24, bent into a double spiral shape, a retaining plate 62 is welded, which widens conically outwards, extends through the inner insulation 17 and is anchored in the outer insulation 4. Through the conical shape of the retaining plate 62, widening outwards and an opening, formed to correspond with it, in the outer insulation 4, the latter is held centered on the slider plate 10. Through a gap, which arises from the burning away of a coating 78, between the outer insulation 4 or 3 and the outer part or the outer end face of the retaining plate 62, the possibility of axial and radial movement of the outer insulation relative to the inner insulation is maintained. The gap mentioned can also be replaced by an elastic filling 71, which can withstand high temperatures.

According to FIGS. 5a and 5b, retaining bolts 11, extending perpendicular to the plane of the slider plate, are arranged on the pipe 24 or on the S-shaped pipe section 28, which bolts have a head 12 of larger diameter. If the retaining bolt 11 extends, in the embodiment in FIG. 5b, through the inner insulation 17 as far as the outer surface of the external insulation 4, the retaining bolt 11 or its head 12, in the example in FIG. 5a, is housed in the interior of the external insulation 4. Thus, in the version according to FIG. 5a, no heat bridges are formed.

The axial and radial mobility of the outer insulations 3 and 4 vis-a-vis the retaining bolts 11 is achieved in that a combustible layer—represented by the thick line—(for example plastic, paint, bitumen or the like) is applied to the bolt, which layer burns away when the slider plate is first put into operation, so that an expansion gap is formed between the respective insulation and the retaining bolt 11 or its head 12.

The retaining bolt 11 can naturally also be formed in such a way that a screw is welded on the pipe 24 or on another carrying part of the slider plate, and a retaining nut can be turned on this screw.

The external flow-side insulation 3 can, as is shown in FIGS. 3a to 3c, be held by retaining members 62, namely retaining pins or ring discs, welded radially inside on the seal and extending radially inwards, which go into corresponding openings of the external flow-side insulation 3.

In FIG. 3*d* the external insulation 3 is limited by a ring 64, welded to the seal 1 and terminating flush with it, which holds the external insulation 3 axially, especially with play.

The respective inner insulations 2, 8 and 17 are essentially held in place only by the outer insulations.

It is, in any case, important to avoid forces, particularly compressive forces, on the outer insulations 3 and 4. What can help in this respect, in addition to the already mentioned alloys, applied to retaining pins or bolts and capable of being burned off after first use, are manufacture-related shrinkage gaps also and/or one or more pressure balance bores 72, as shown in FIG. 5*b*. The mobility in axial and radial direction of the outer insulation is arranged here in such a way that the difference of the expansion coefficient between steel and insulation material is compensated. Besides this, the shrinkage gaps mentioned define heat-insulating layers of air, through which the total degree of insulation is additionally increased.

Since the slider plate, when closed, is only subject to secondary vortices from the hot air duct and, for example the so-called Cowper, and, when open inside the housing, only to secondary vortices and not to any dynamic flow, no dynamic temperature discharge can occur. The maximum load thus occurs in the changeover processes, to which the expansion gaps must be adjusted.

In order to prevent premature signs of wear on the outer insulation 5, baffle plates 61 (FIG. 2), extending radially outwards, are welded on the flow side on the radially outer peripheral surface of the seal 1.

Figure 7:
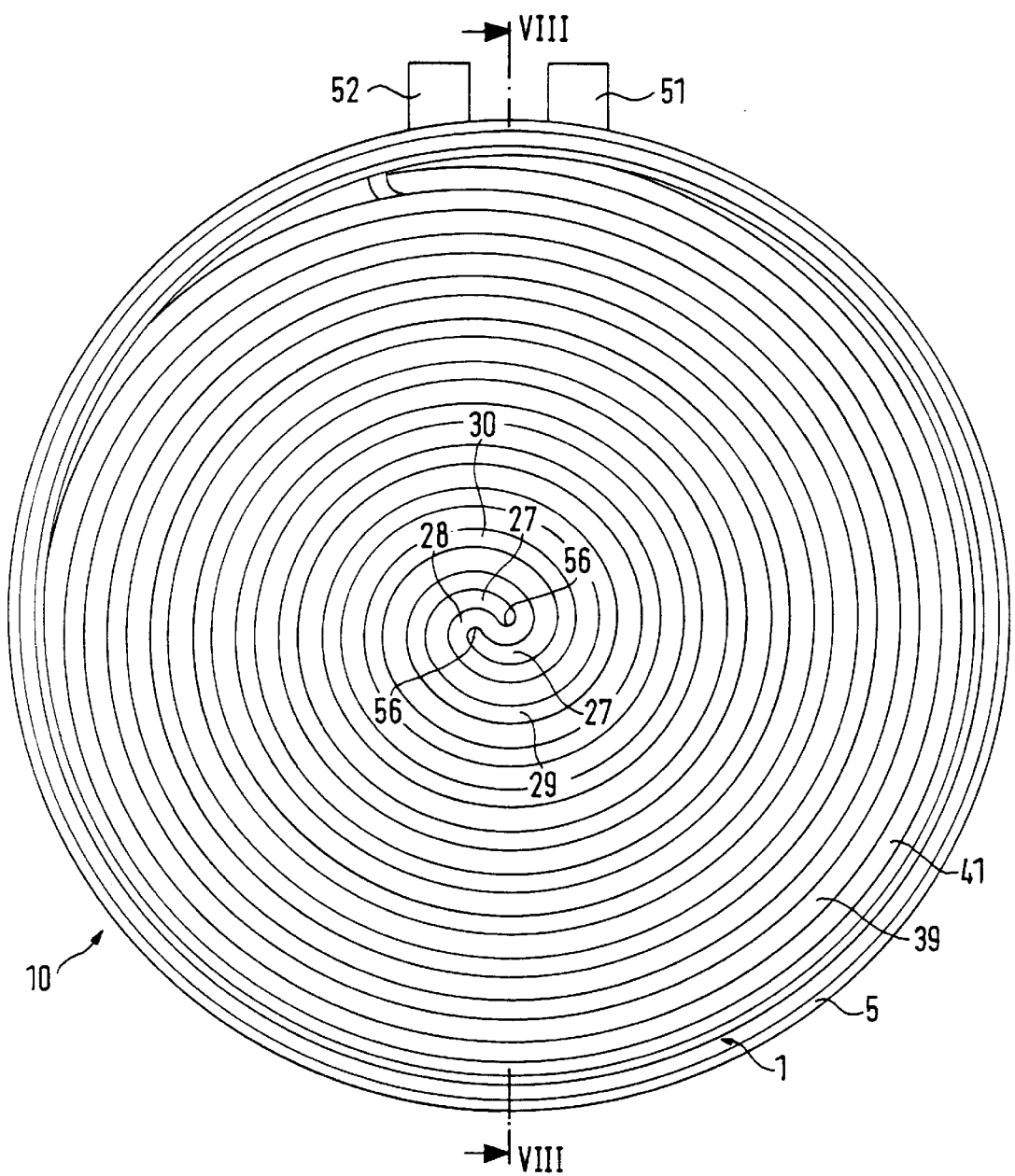
Figure 8:
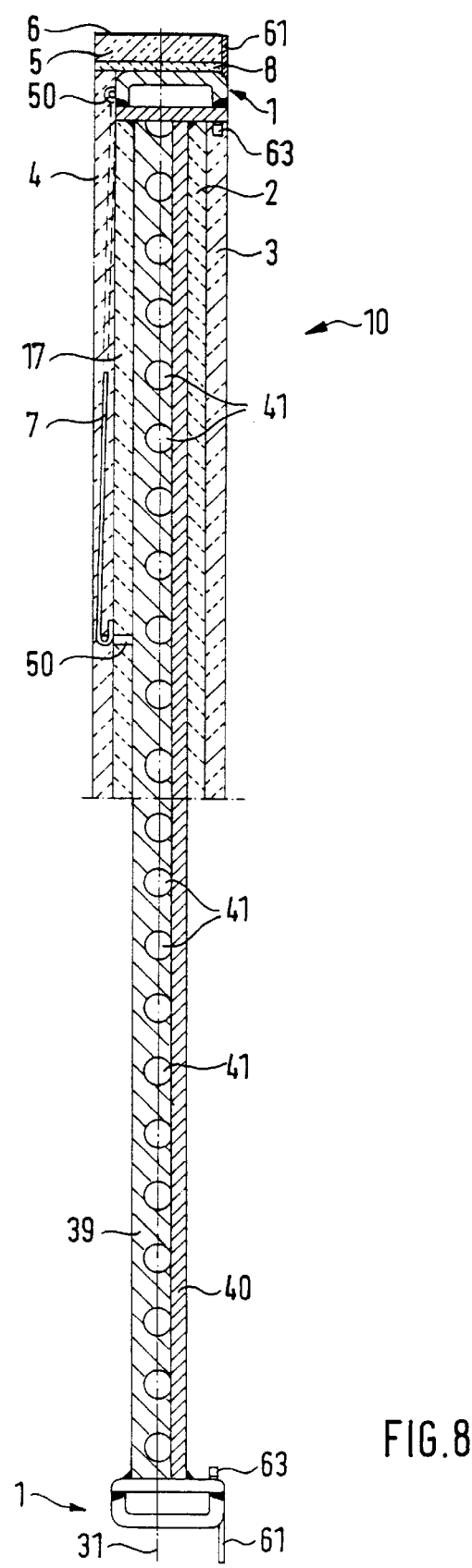

In FIGS. 7 and 8, a second embodiment of a cooled slider plate 10 is shown. The carrying part of the slider plate 10 limited by the seal 1, is formed by a circular base plate 39 and a thinner cover plate 40 having the same diameter. In the base plate 39, a double spiral shaped groove 41 is formed, for instance milled in. By applying the cover plate 40 to the base plate 39 the groove is closed and thus a cooling channel formed. The groove 41 is connected, in each case at the end side, with a cooling medium inlet 51 and cooling medium outlet 52, through which the cooling medium is led into the cooling channel or out of it again.

Also, in the present case, a flow reversal occurs in an S-shaped groove section which is provided in a central region of the slider plate 10 and connects with the spiral sections 29 and 30. The bend radius 56 of the groove 41 in the flow reversal area 27 is not, as in the previously described version, restricted by material properties, so that no additional measures have to be taken for adequate cooling of the central area.

The design, arrangement and attachment of the insulation are on similar lines to the previous embodiment, given by way of example.

Applying the cover plate 40 to the base plate 39 occurs by means of explosion joints, one or more operations being necessary according to the required thickness of the cover plate 40. In joining the cover plate 40 and the base plate 39, the double spiral shaped groove 41 is filled with a material which maintains the cross-section shape of the groove 41 in the joining process. Because of the extraordinary speed of joining, the material does not have to satisfy any particular strength requirements or withstand particular temperatures. An alloy or a metal with low melting point and low wetting capacity can be used, which can be easily removed again after the joining process by heating the whole member. Before joining, the two surfaces to be joined must be worked, in order to be able to guarantee a defined minimum surface roughness. With the joining process a quick, simple and secure connecting technique is provided, which guarantees a leak-proof cooling channel. The "exploded" cover plate is connected (extensively) flat with the base plate 39.

Alternatively, it is possible to use two thinner plates, in which, on both surfaces turned towards one another, double spiral shaped grooves are incorporated, in each case mirrored. When an exact and centered connection of both plates formed in this way is achieved, a double spiral shaped cooling channel is also formed thereby. What is advantageous in this is a more homogenous temperature distribution on the metal surface of the cooled slider plate 10.

In the FIGS. 9 to 13*b* a third alternative of a cooled slider plate is shown. The carrying structure of the slider plate 10 consists of a circular carrying plate 37. On one side of the latter a metal sheet 42 with the same diameter is applied. The metal sheet 42 has a double spiral shaped opening, so that a double spiral shaped cooling channel is formed between the carrying block 37 and the applied metal sheet 42, when the metal sheet 42 is applied to the carrying plate 37. (See FIG. 13*a*).

The double spiral shaped opening or distortion in the metal sheet 42 can be achieved, for example, in the following ways.

On the carrying plate 37, a previously mentioned alloy or a metal 78 (see FIG. 19*a*) with low melting point and low wetting capacity is applied in a double spiral shape. This shaping material serves as a forming profile for the metal sheet 42. When the metal sheet 42 is joined (see arrows 79 in FIG. 19*a*) to the carrying plate 37, particularly when it is "exploded" on (explosive forming) the openings in the metal sheet 42—and thus the cooling channel 18 (see FIG. 19*b*) between metal sheet 42 and carrying plate 37—are formed and at the same time the metal sheet, in the places without distortion, is connected securely and impermeably to the carrying plate 37 (see connection surfaces 77 in FIG. 19*b*). The height of the cooling channels corresponds to the necessary acceleration distance of the metal sheet 42, which, when it lands on the carrying plate 37, creates a pressure of some 100 kbar and, at the joints causes an intermetallic connection of great strength. Bevelling of the material on the flanks, poured on and serving as a forming profile, depends on the toughness of the metal sheet 42. The metal-shaping alloy or, alternatively the metal-shaping metal can be formed on the carrying plate 37 with the aid of temperature-resistant moulds with different, e.g. semicircular or rectangular cross-sections. The mould can extend longitudinally on the carrying plate in a double spiral, zigzag or meander shape.

Figure 19A:
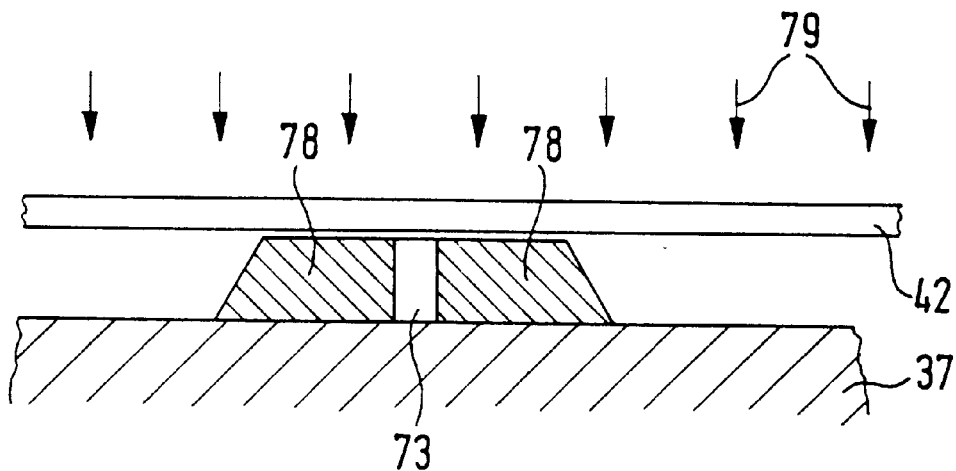
Figure 19B:
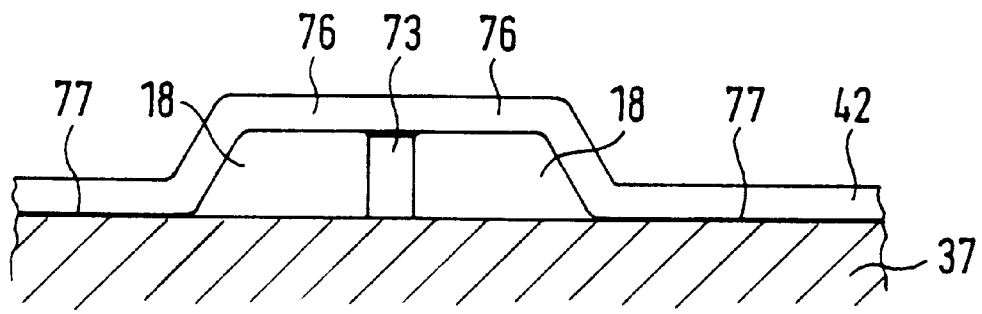

In FIGS. 19*a* and 19*b*, a crosspiece 73 can be recognized, which is embedded in the metal-shaping alloy and already joined to it before the metal sheet 42 and the carrying plate 37 are joined. The metal sheet 40, when it is joined to the carrying plate, is securely connected to the upper side of the crosspiece 73, which likewise extends in a double spiral, meander or zigzag shape. After the alloy has been melted out, the crosspiece 73 then separates the cooling agent inflow from the cooling agent outflow channel.

Alternatively, the openings in the metal sheet 42 can also be formed before the metal sheet 42 is applied to the carrying plate 37. The connection between metal sheet 42 and carrying plate 37 can then be made by means of roll welding.

Figure 20A:
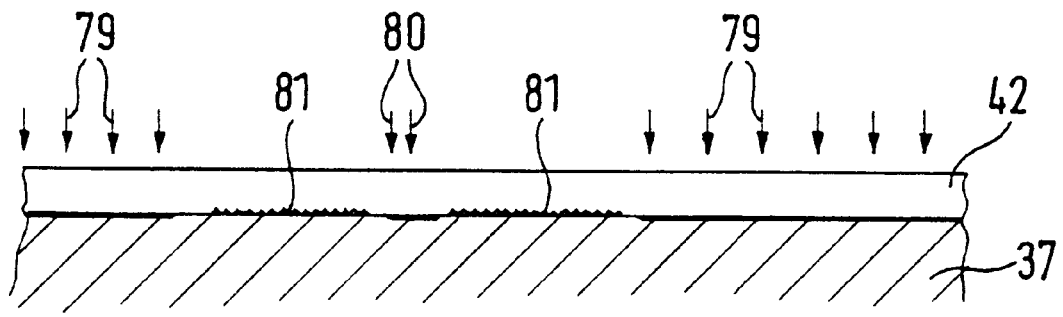
Figure 20B:
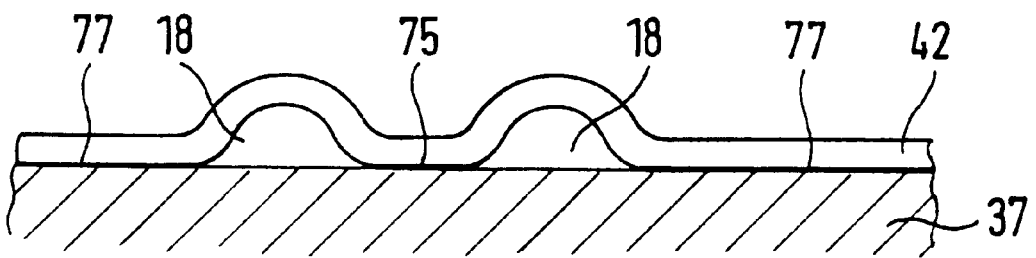

A further possible way of forming the cooling channel 18 is shown in FIGS. 20*a* and 20*b*. The metal sheet 42 is applied to the carrying plate 37 in certain places—see arrows 79 and 80—by explosion joints. A surface of the carrying plate 37, which is later situated in the cooling channel and extends corresponding to the cooling channel 18, has a roughness 81 of such a kind that in this area no connection is effected between metal sheet 42 and carrying plate 37. Thus line or surface connection only exists in the areas indicated by the thick lines 75 and 77.

After the metal sheet 42 has been applied to the carrying plate 37, a hydraulic fluid is introduced between the two plate parts and admitted at a pressure of up to 5000 bar. In this way, the cooling channel 18 is formed with "hydraulic inflation" of the metal sheet 42. The inflated part of the metal sheet represents the boundary of the cooling channel 76.

In contrast to the two first mentioned embodiments of a slider plate, given by way of example, according to the third alternative as per FIGS. 9 to 13b, the seal 1 is formed in that a U-section ring is arranged in the end region of the carrying plate 37, on the plate's flow side (in all the appended overall diagrams always the right-hand side!). The seal terminates radially externally flush with the carrying plate 37. The mentioned arrangement of the seal 1 is depicted e.g. in FIG. 15, which shows a further alternative way of constructing a slider plate, to be described in more detail below.

Figure 11:
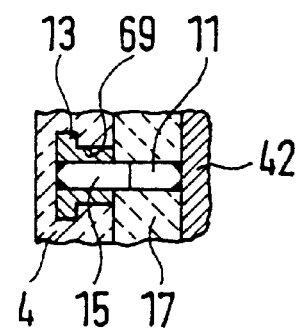
Figure 12:
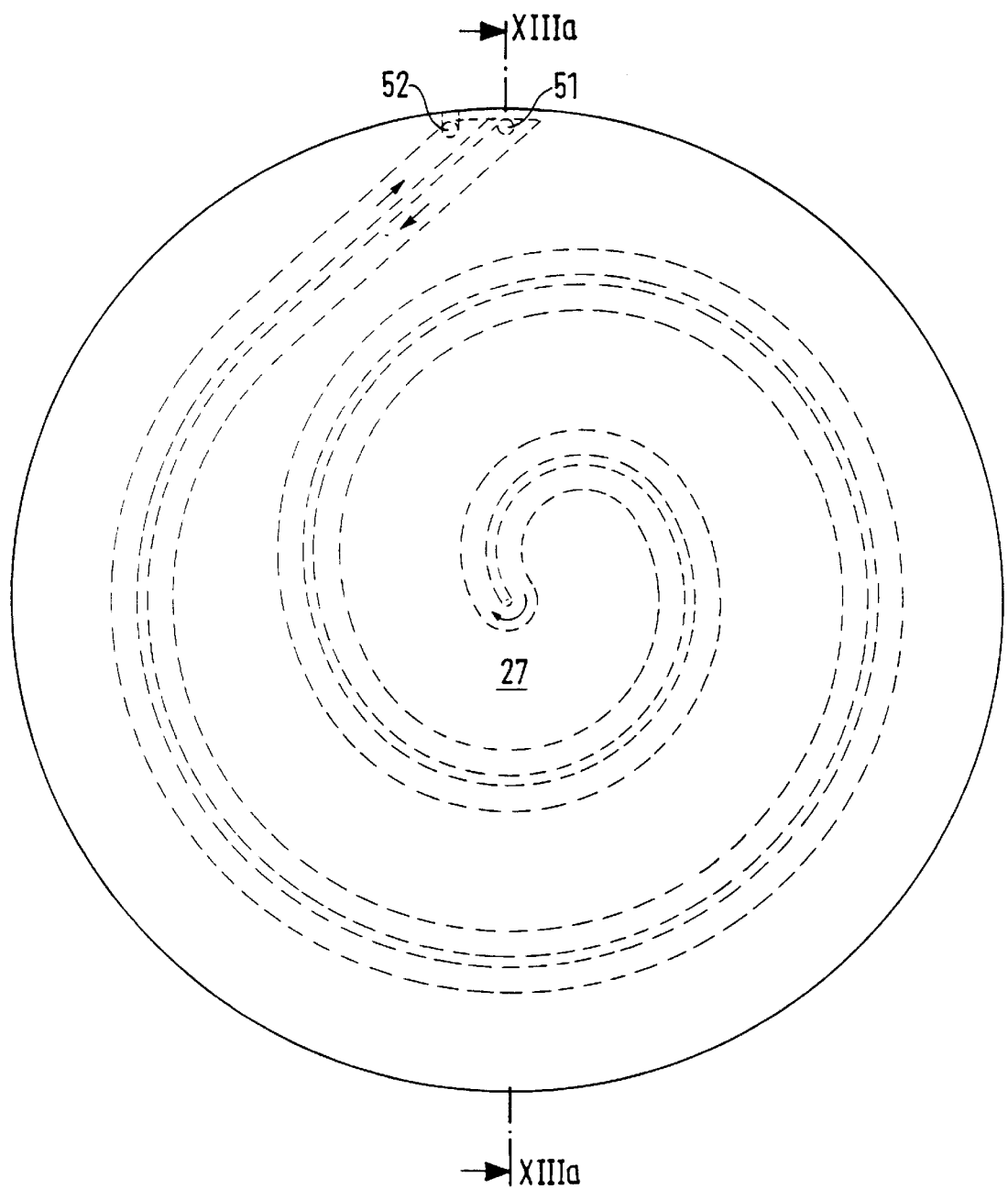

Radially inside the seal 1 and on the flow side, as well as on the metal sheet 42 on the pressure side, the outer insulations 3 and 4 as well as the inner insulations 2 and 17 are arranged, as described before. For this purpose, a screw pin, welded on the metal sheet 42, is used as a retaining pin 15, as is shown in FIG. 11, on to which pin a head nut 13 can be screwed. As already mentioned previously, the head nut 13 is at least provided on the perimeter with a material that can be easily burned off, so that an expansion gap occurs after the first use of the slider plate.

Figure 9:
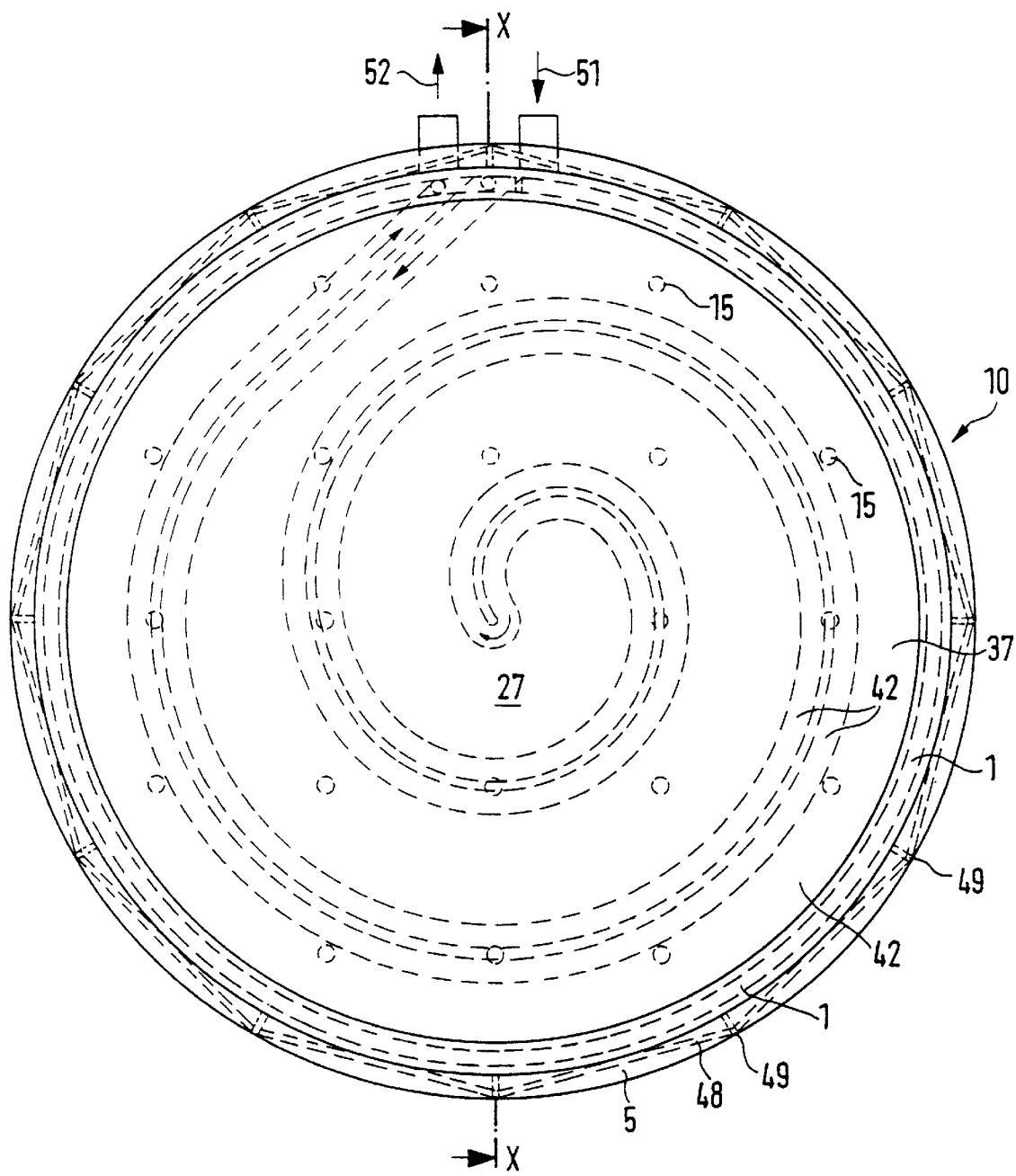
Figure 10:
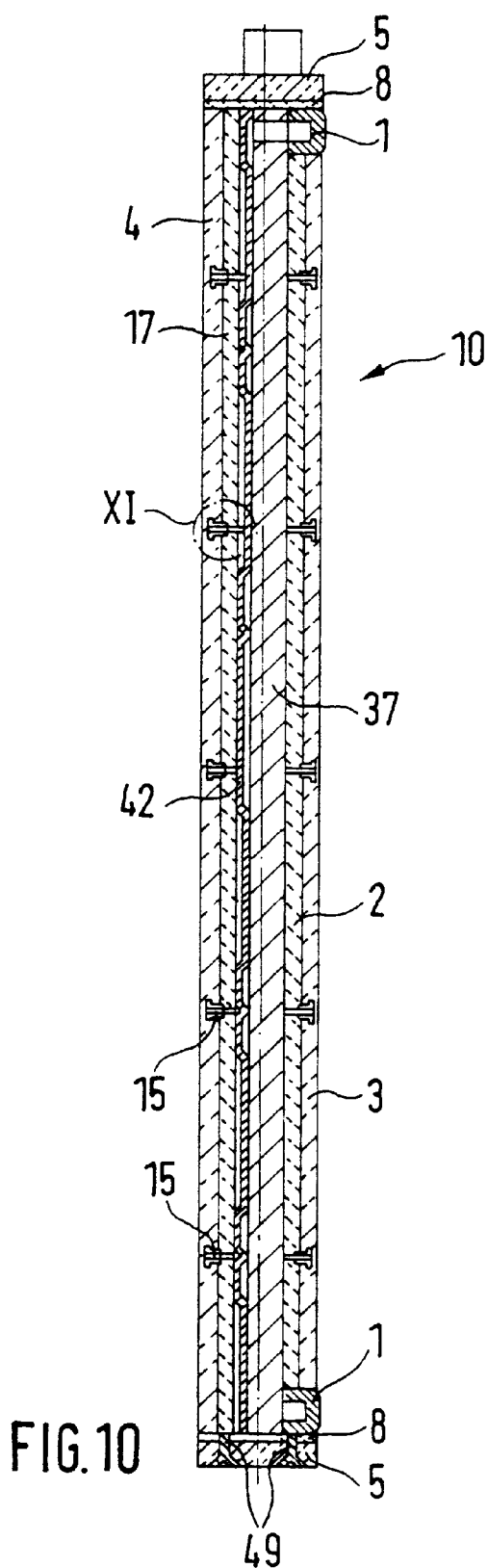

The retaining pins 15 are, as can be seen from FIG. 9, arranged like a grid on the metal sheet 42, so that an even attachment of the insulation over the whole slider plate 10 is guaranteed.

The cooling channel formed by the openings in the metal sheet 42 is connected at the end side with a cooling medium inlet 51 as well as a cooling medium outlet 52. In the central region of the slider plate 10 the flow direction of the cooling medium also reverses thereby (flow reversal area 27).

The outer insulation 4, the inner insulation 17, the metal sheet 42, the carrying plate 37 as well as the seal 1 welded on to it, form radially externally a flush perimeter surface, on which lie the insulations 8 and 5, arranged on the perimeter. Through the inner insulation 8 and a part of the outer insulation 5, 'y' armatures arranged in equal angular separation from one another extend in two planes, in the forks of which armatures two tightening cords 48 are held running parallel to each other and extending inside the outer insulation ring 5 and holding the outer insulating jacket radially together. The tightening cords 48 consist likewise of an insulating material, especially of ceramic material.

Figures 13A, 13B:
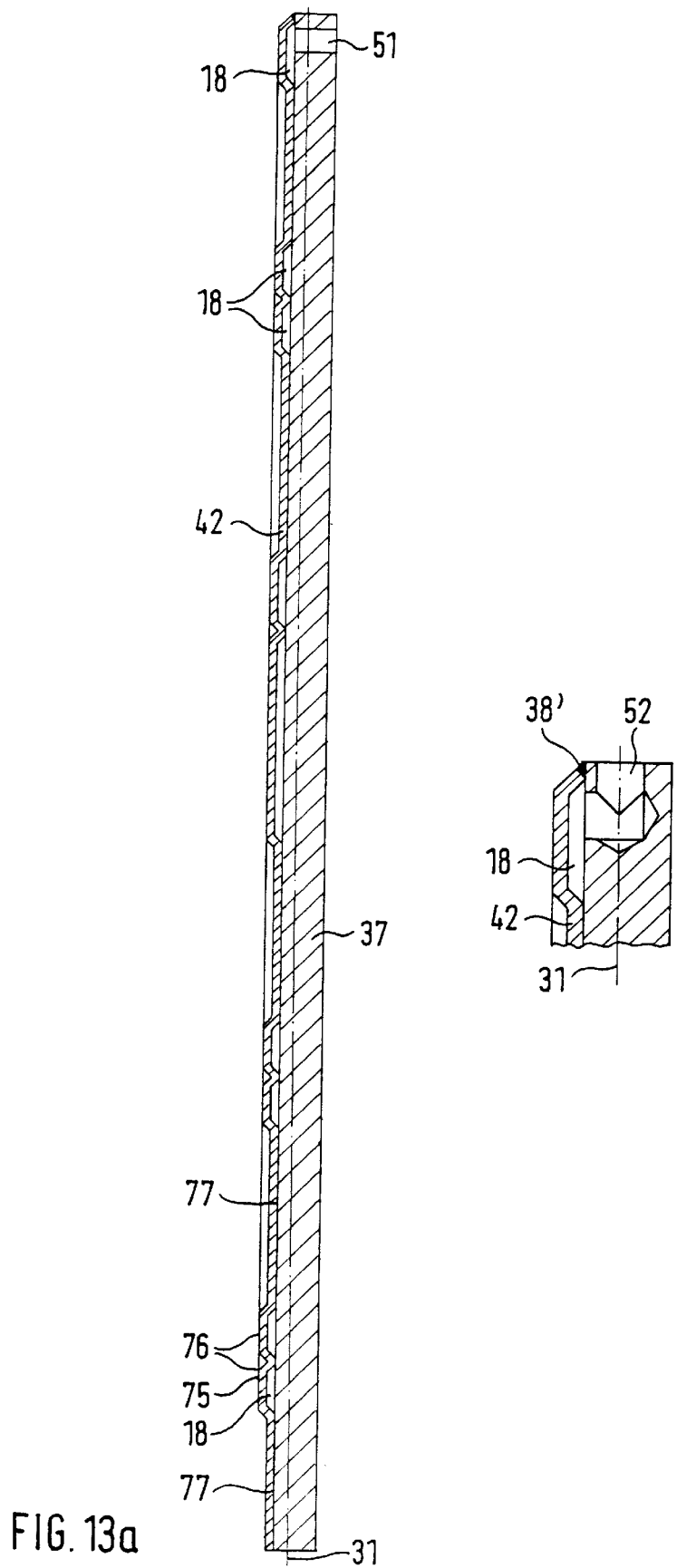

In FIG. 13b a possible way of constructing a cooling channel exit is shown. In this, two bores, formed perpendicular to one another and inter-connected, are arranged on the radially outer end of the carrying plate 37, and the bore extending essentially horizontally makes a fluid connection with the cooling channel and the bore extending radially outwards provides the connection with, for example, the cooling medium outlet 52. According to FIG. 10, the cooling channel can also be in a direct fluid connection with a cavity provided in the seal 1 through a bore extending axially through the carrying plate 37.

In FIGS. 14 to 18 a fourth alternative for a cooled slider plate 10 is shown. Unlike the previous embodiment, given by way of example, the carrying plate 37 and the metal sheet 42 are replaced by a core plate 43. In the core plate 43, bores 44 and 45 are provided, extending perpendicular to one another, which extend in the middle plane of the plate and intersect, forming a cooling channel. The arrangement of the bores 44, 45 is represented in FIG. 14 by broken lines. First, a vertical blind hole bore 45 extends downwards from the fluid medium inlet 51 and crosses at its lower end a blind hole bore 44 extending horizontally. In the area of the outer end of this blind hole bore, a bore 45 is arranged, which extends in a vertical direction and is connected at its lower end with a horizontal blind hole bore. This is connected to a vertical blind hole bore, which intersects at its upper end with a further horizontal blind hold bore. Thus half of the cooling channel is essentially formed. The other half is made in similar fashion, as can easily be seen from FIG. 14.

In order to form a pre-determined flow course, a closure stopper 46 is inserted into a bore 44 (see FIG. 14). For this purpose an axial bore 54 is formed, which intersects the horizontal blind hole bore 44 in such a way that, through the insertion of the closure stopper 46 in the axial bore 54, the passage of the horizontal blind hole bore 44 is closed. Thus an approximately meander-shaped channel is formed, through which the cooling medium can flow through the slider plate 10.

The openings in the core plate 43 are closed radially externally by the bores 44 and 45, so that no cooling medium can escape.

Figure 17:
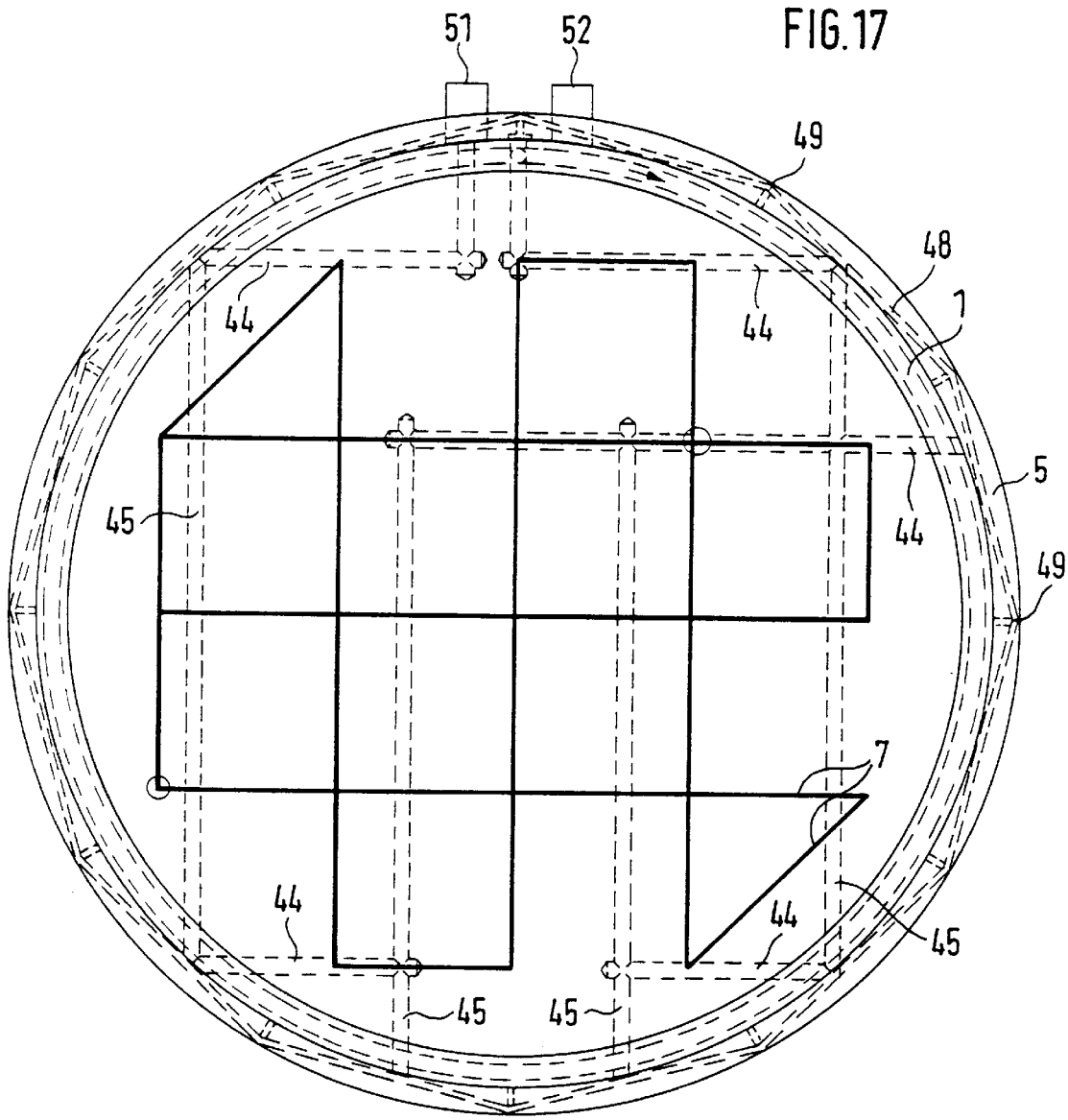
Figure 18:
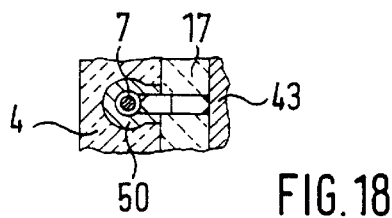

In FIG. 17 is shown a guide, by way of example, of a tightening cord 7, that is arranged in the external pressure-side insulation 4 of the slider plate 10. The tightening cord 7 extends in two directions parallel to one another, in a meander shape or with the formation of a tightening cord network. Thus even retention of the external insulation 4 in a radial and tangential way is achieved, with a certain amount of play remaining for the insulation in radial and axial directions. In this arrangement, the tightening cord 7 is guided in eyelets or ring pins welded on the carrying part of the slider plate 10, one of these eyelets or ring pins being shown in FIG. 18.

At the top of FIG. 15, it can be seen that, through an axial bore through the core plate 43, the cavity of the seal 1 is in a fluid connection with the cooling channel formed in the core plate 43, thus the seal can also be cooled.

With the above-mentioned four alternatives for a cooled slider there are simple and cheap possible ways of construction, only minimal cooling being necessary because of the use of double-layered insulation and the avoidance of heat bridges. This results in low water consumption and a low pump capacity. In the above-mentioned alternatives, the cooling channel cross-section can, moreover, always be adapted to the necessary cooling capacity for a cooled slider plate. Furthermore, it is possible to repair at any time any leaks that might occur, by nondestructive removal of the insulating elements.

| List of reference numbers | |
| --- | --- |
| 1 | seal |
| 2 | Microporous ceramic plate |
| 3 | ceramic foam plate |
| 4 | ceramic foam plate |
| 5 | insulation (outside) |
| 6 | ceramic fiber fabric |
| 7 | tightening cord |

-continued

List of reference numbers

| | |
|---|---|
| 8 | insulation (inside)/insulating mat (elastic) |
| 10 | hot air slider plate |
| 11 | retaining bolts |
| 12 | head (of 11) |
| 15 | retaining pin |
| 17 | Mikrothen plate |
| (18 | cooling channel) |
| 20 | intermediate plate |
| 21 | metal sheet |
| 22 | U-section ring (of 1) |
| 23 | ring (of 1) |
| 24 | pipe (cooling pipe) |
| 27 | flow reversal area |
| 28 | S-shaped pipe section |
| 29 | spiral pipe section |
| 30 | spiral pipe section |
| 31 | slider plates - middle plane |
| 32 | partial space |
| 33 | partial space |
| 34 | inlet aperture |
| 35 | outlet aperture |
| 36 | cross wall |
| 37 | carrying plate |
| 38 | weld seams |
| 38' | weld seams |
| 39 | base plate |
| 40 | cover plate |
| 41 | groove |
| 42 | metal sheet |
| 43 | core plate |
| 44 | bore |
| 45 | bore |
| 46 | closure stopper |
| 48 | tightening cord |
| 49 | 'Y' armature |
| 50 | ring pin/eyelet |
| 51 | cooling medium inlet |
| 52 | cooling medium outlet |
| 54 | axial bore |
| 56 | bend radius |
| 58 | outflow area |
| 59 | inflow area |
| 61 | baffle plate |
| 62 | retaining plate |
| 63 | retaining member |
| 64 | retaining ring |
| 65 | throttle place |
| 67 | cooling medium flow arrows |
| 69 | combustible coating |
| 70 | space (central) |
| 71 | elastic member or combustible layer |
| 72 | relief bore |
| 73 | crosspiece |
| 75 | line explosion |
| 76 | cooling channel boundary |
| 77 | surface connection |
| 78 | alloy |
| 79 | arrows (surface explosion) |
| 80 | arrows (line explosion) |
| 81 | roughness difference |

We claim:

1. A cooled slider plate, especially a water-cooled hot air slider plate (10), with a cooling channel through which a cooling medium, especially water flows and a seal (1) extending over the perimeter of the slider plate, both sides of the slider plate (10), with the exception of the part of the seal (1) adapted to adjoin a seal seat of a slider housing, being covered with a heat-insulating material (2, 3, 4, 5, 8, 17), characterized in that the part of the slider plate (10) limited by the seal (1) is formed by a core plate (43), which incorporates bores (44, 45) extending in the plane of the plate, particularly in the middle plane of the plate, which bores are in a fluid connection with one another with the forming of a predetermined, especially meander-shaped cooling channel.

2. The slider plate according to claim 1, characterized in that the bores (44, 45) in fluid connection with one another extend approximately perpendicular to one another and are formed by preference from radially outside, especially with the forming of a predetermined bore, and thus cooling channel, grid.

3. The slider plate according to claim 2, characterized in that closure stoppers (46) can be inserted into the bores (44, 45) to form a predetermined flow course for the cooling medium.

4. The slider plate according to claim 3, characterized in that the closure stoppers (46) can each be inserted into an axial bore (54), formed in the area of a bore (44 and/or 45), in such a way that the passage of the related bore (44, 45) is closed impermeably.

5. The slider plate according to one of claims 1 to 4, characterized in that the openings, lying radially outside, of the core plate bores (44, 45)—apart from a cooling medium inlet aperture and a cooling medium outlet aperture—can be closed by stoppers or similar blocking elements.

6. The slider plate according to one of claims 1 to 4, characterized in that the heat-insulating covering of the slider plate (10) is formed in two layers, especially from inside to outside consisting of:

an inner insulation, especially a microporous ceramic plate (2 or 16 or 8), and an outer insulation, especially a ceramic fiber foam or refractory concrete plate (3 or 4 or 5).

7. The slider plate according to claim 6, characterized in that the outer insulation (3, 4, 5) is arranged with axial and radial play relative to the inner insulation (2, 8, 17) and/or to the carrying part of the slider plate (10), to prevent destruction of the insulation through bending of the slider plate (10) and/or thermal stress.

8. The slider plate according to claim 6, characterized in that the outer insulation (5) is faced radially by a jacket element, particularly a ceramic fibre fabric (6).

9. The slider plate according to one of claim 6, characterized in that the heat-insulating covering is anchored by retaining bolts (11) or pins (15) extending approximately perpendicular to it.

10. The slider plate according to claim 9, characterized in that the retaining bolts (11) or pins (15) are provided with a layer, which is destroyed at high temperatures, especially burnt away.

11. The slider plate according to one of claims 1 to 4, characterized in that the outer insulation (4, 5), extending parallel to the slider plate (10) is pretensioned radially and/or tangentially by tightening members, especially tightening cords (7), consisting of insulating material, especially ceramic material.

12. The slider plate according to claim 11, characterized in that the tightening members, especially the tightening cords (7), extend preferably in two directions perpendicular to one another respectively in the shape of a meander or network.

13. The slider plate according to claim 11, characterized in that the tightening members, especially the tightening cords (7) are arranged in the interior of the external insulation (4, 5).

14. The slider plate according to one of claims 1 to 4, characterized in that within the insulation (5) extending over the outer perimeter of the slider plate (10), a tightening cord (48) is arranged, which holds the external insulating jacket radially together.

15. The slider plate according to claim 14, characterized in that the tightening cord (48) is tightened via a ring or 'y' armature (49) arranged on the outer perimeter of the seal (1) with approximately equal angular separation from one another.

16. The slider plate according to one of claims 1 to 4, characterized in that the seal (1) also has cooling medium flowing through it, the free flow cross-section being so, dimensioned that the cooling medium flows through the seal (1) at approximately the same speed as the rest of the cooling channel sections.

\* \* \* \* \*